(12) United States Patent
Renner (10) Patent No.: US 12,061,487 B2
(45) Date of Patent: Aug. 13, 2024

(54) PRESSURE REDUCER

(71) Applicant: HUSQVARNA AB, Huskvarna (SE)

(72) Inventor: Thomas Renner, Ulm (DE)

(73) Assignee: HUSQVARNA, Huskvarna (SE)

( * ) Notice: Subject to any disclaimer, the term of this patent is extended or adjusted under 35 U.S.C. 154(b) by 0 days.

(21) Appl. No.: 18/273,099

(22) PCT Filed: Dec. 13, 2022

(86) PCT No.: PCT/EP2022/085618
§ 371 (c)(1),
(2) Date: Jul. 19, 2023

(87) PCT Pub. No.: WO2023/232276
PCT Pub. Date: Dec. 7, 2023

(65) Prior Publication Data
US 2024/0094749 A1    Mar. 21, 2024

(30) Foreign Application Priority Data
Jun. 1, 2022  (EP) .................................. 22176756

(51) Int. Cl.
*G05D 16/06*    (2006.01)
(52) U.S. Cl.
CPC .................. *G05D 16/065* (2013.01)
(58) Field of Classification Search
CPC ................................................. G05D 16/065
See application file for complete search history.

(56) References Cited

U.S. PATENT DOCUMENTS

| | | | |
|---|---|---|---|
| 2,252,152 A | * | 8/1941 | Ernest ................ G05D 16/0663 137/116.5 |
| 2,806,481 A | | 9/1957 | Faust |

(Continued)

FOREIGN PATENT DOCUMENTS

| CN | 104295780 B | 6/2016 |
|---|---|---|
| CN | 106402447 A | 2/2017 |

(Continued)

OTHER PUBLICATIONS

International Search Report and Written Opinion from International Application No. PCT/EP2022/085618 mailed Mar. 22, 2023, all enclosed pages cited.

*Primary Examiner* — Patrick C Williams
(74) *Attorney, Agent, or Firm* — Burr & Forman LLP (57) ABSTRACT

A pressure reducer assembly (100) includes a pressure reducer body (110) defining at least one pressure reducer chamber (120) along a central axis (X-X'). The pressure reducer chamber (120) includes an inlet section (122) and an outlet section (124) fluidly coupled with the inlet section (122). The pressure reducer assembly (100) further includes a spring-operated hollow piston rod (121) having a center (X) along the central axis (X-X'), a cylindrical inner peripheral surface comprising an inner diameter (A), and a cylindrical outer peripheral surface comprising an outer diameter (B). A diaphragm (128) made of elastic material is adapted to be operatively coupled with the piston rod (121). The diaphragm (128) includes a central hole (150) having a center (Y) along a central axis (W-W') and a diameter (C). The pressure reducer assembly (100) is characterized in that, in an unmounted state, the outer diameter (B) of the piston rod (121) is greater than the diameter (C) of the central hole (150) of the diaphragm (128), whereas in a mounted state, the outer diameter (B) of the piston rod (121) is the same as the diameter (C) of the central hole (150) of the diaphragm (Continued)

(128), and the diaphragm (128) is assembled over the piston rod (121) so that the central axis (X-X') of the piston rod (121) coincides with the central axis (W-W') of the diaphragm (128).

14 Claims, 4 Drawing Sheets

(56) References Cited

U.S. PATENT DOCUMENTS

| | | | | |
|---|---|---|---|---|
| 4,543,985 | A * | 10/1985 | Healy | G05D 16/0655 137/505.21 |
| 5,875,815 | A * | 3/1999 | Ungerecht | G05D 16/0658 137/508 |
| 6,374,853 | B1 * | 4/2002 | Callies | G05D 16/0608 137/505.25 |
| 9,367,070 | B2 * | 6/2016 | Greenwood | G05D 16/0636 |
| 9,459,631 | B2 * | 10/2016 | Lawyer | G05D 16/0608 |
| 2008/0135102 | A1 * | 6/2008 | Aluigi | B63C 11/2209 137/81.2 |
| 2012/0227838 | A1 * | 9/2012 | Ungerecht | F16K 1/123 137/528 |
| 2017/0172961 | A1 * | 6/2017 | Heller | A61K 9/0097 |
| 2018/0120866 | A1 | 5/2018 | Drechsel | |
| 2019/0257437 | A1 | 8/2019 | Higashi et al. | |

FOREIGN PATENT DOCUMENTS

| | | |
|---|---|---|
| CN | 206190994 U | 5/2017 |
| CN | 206429714 U | 8/2017 |
| CN | 207740507 U | 8/2018 |
| DE | 10059317 A1 | 6/2002 |
| EP | 385922 A2 | 9/1990 |
| EP | 0572966 A1 | 12/1993 |
| EP | 1525399 B1 | 6/2008 |
| EP | 1945951 B1 | 2/2009 |
| GB | 926713 A | 5/1963 |
| JP | 4679855 B2 | 5/2011 |
| WO | 9627095 A1 | 9/1996 |
| WO | 03/057998 A2 | 7/2003 |
| WO | 2015008200 A1 | 1/2015 |

\* cited by examiner

PRESSURE REDUCER

TECHNICAL FIELD

The present disclosure relates to an assembly of a pressure reducer. More specifically, the present disclosure relates to an improved and cost-effective diaphragm of the pressure reducer.

BACKGROUND

Pressure reducers are found in many common domestic and industrial applications. For example, pressure reducers are used in gas grills to regulate propane, in home heating furnaces to regulate natural gases, in medical and dental equipment to regulate oxygen and anesthesia gases, in pneumatic automation systems to regulate compressed air, in engines to regulate fuel and in gardening systems to regulate irrigation. As this partial list demonstrates there are numerous applications for pressure reducers yet, in each of them, the pressure reducers provide the same function. The pressure reducers reduce a supply (or inlet) pressure to a lower outlet pressure and work to maintain this outlet pressure despite fluctuations in the inlet pressure. The reduction of the inlet pressure to the lower outlet pressure is the key characteristic of the pressure reducers.

The pressure reducer includes a pressure reducer body that defines a pressure compensation hole and further includes a spring-operated piston rod and a radial lip seal like diaphragm which seals radially in the pressure reducer body and allows pressure control. However, due to the axial movement of the piston rod, grooves may form in the sealing surface over time and may result in leakage. The pressure reducer may leak and lose fluid via the pressure compensation hole thereby reducing the functional accuracy of the pressure reducer.

Efforts have been made with time to overcome the above-mentioned deficiencies. Improved designs include the pressure reducers with roll diaphragm technology. The axial motion of such a diaphragm arises from the whaling motion of a U-shaped geometry. However, such diaphragms have larger diameters requiring more installation space and are expensive to manufacture. An example of roll diaphragms is provided in Chinese utility model 206,429,714.

Further, there are pressure reducers with flat diaphragms which are reinforced in the middle with a fabric insert and are not stretchable. These flat diaphragms are pressed axially between two metal discs resulting in high assembly and manufacturing costs. In addition, the stroke of the flat diaphragm is very low (up to 2 mm), as the flat diaphragm is not stretchable.

Furthermore, an example of a regulator device including a diaphragm is disclosed in US patent application US 2018/0120866 A1 (hereinafter referred to as '866 reference). The '866 reference discloses the regulator device comprising a main hollow body having an inlet end and an outlet end for a liquid, a tubular valve member accommodated in the main hollow body, an elastic diaphragm and a coil spring placed at the periphery of the valve member. The tubular valve member comprises an outer annular flange to which an inner peripheral edge of the annular shaped elastic diaphragm is mounted. Further, an outer annular edge of the elastic diaphragm is fastened to the main hollow body via an open annular edge of a sleeve. The coil spring has a calibrated spring modulus and is placed at the periphery of the valve member. The coil spring acts on the valve member to counteract a force generated on the flange by a pressure of the liquid collected in a regulating chamber, to maintain a regulating end at a normal distance from the inlet end for the liquid. Further, a diameter of a central hole of the annular elastic diaphragm is greater than an outer diameter of a cylindrical outer surface of the tubular valve member. The disclosed annular elastic diaphragm is at its inner peripheral edge respectively its outer peripheral edge axially clamped between respective parts of the regulator device. Additionally, the stroke of the hollow valve member is geometrically limited. At the same time the functionality of the regulator device is dependent on the axial clamping connection and therefore fragile.

Hence, an improved and cost-effective diaphragm design is required which may help in maintaining the functional accuracy of the pressure reducer over a long period of time.

SUMMARY

In view of the above, it is an objective of the present invention to solve or at least reduce the drawbacks discussed above. The objective is at least partially achieved by a pressure reducer assembly. The assembly of the pressure reducer includes a pressure reducer body defining at least one pressure reducer chamber along a central axis. The pressure reducer chamber includes an inlet section and an outlet section fluidly coupled with the inlet section such that the inlet section and the outlet section allow inlet and outlet of the fluid respectively. The assembly further includes a spring-operated piston rod having a center along the central axis, an inner diameter, and an outer diameter. Further, a diaphragm made of elastic material is adapted to be operatively coupled with the piston rod. The diaphragm includes a central hole having a center along a central axis and a diameter. The assembly of the pressure reducer is characterized in that the outer diameter of the piston rod is greater than the diameter of the central hole of the diaphragm and the diaphragm is assembled over the piston rod so that the central axis of the piston rod coincides with the central axis of the diaphragm.

Further, the piston rod is a hollow piston rod further having a cylindrical inner peripheral surface comprising respectively defining the inner diameter, and a cylindrical outer peripheral surface comprising respectively defining the outer diameter. The outer diameter of the piston rod is greater than the diameter of the central hole of the diaphragm in an unmounted state, whereas in a mounted state, the outer diameter of the piston rod is the same as the diameter of the central hole of the diaphragm.

Thus, the present disclosure provides an improved diaphragm design for the pressure reducer. The diaphragm advantageously includes a central hole with the diameter less than the outer diameter of the piston rod, in the unmounted state, such that when the diaphragm is forced over respectively mounted or assembled to the piston rod, the diaphragm deforms due to a radial stress. The deformation of the diaphragm significantly improves the stroke length of the diaphragm.

The inner diameter is the diameter of the hollow part of the piston rod. The outer diameter is the diameter of the outer cylindrical surface. Further, the cylindrical inner peripheral surface is opposite to the cylindrical outer peripheral surface.

According to an embodiment of the present disclosure, in the unmounted state, the diameter of the central hole of the diaphragm is equal to the inner diameter of the piston rod. The diameter of the central hole of the diaphragm is preferably smaller than the outer diameter of the piston rod, in the unmounted state, in order to produce the radial stress over the diaphragm that leads to deformation of the diaphragm, when the diaphragm is in the mounted state. The deformation illustrated in the present disclosure is a conical deformation such that the conical deformation of the diaphragm leads to bistable buckling of the diaphragm.

According to an embodiment of the present disclosure, the diaphragm is made of silicone. The silicone is known for its retention of flexibility and low compression set in extreme heat or cold. Silicone rubber is very durable and overall, has good mechanical properties. Because of its durability, it is extremely reliable and is trusted to keep up performance for a long time. The silicone diaphragm may thus be long lasting and cost-effective as it may require less maintenance. Further, the silicone diaphragm offers great electrical insulation, is flame repellent and has a low chemical reactivity.

According to an embodiment of the present disclosure, the diaphragm is produced by stamping. The stamping process is cost-effective, fast and demands little labor as well as machine operation. Further, the stamping process reduces material wastage, improves accuracy and may be automated.

According to an embodiment of the present disclosure, the piston rod includes a diaphragm support surface. The diaphragm support surface prevents slippage of the diaphragm away from the piston rod. Further, it transmits fluid force to the piston rod such that the piston rod displaces axially.

According to an embodiment of the present disclosure, the an annular nose is provided adjacent to the diaphragm to press it downwards when a spring is in an expanded state such that the spring presses the diaphragm in a direction opposite to the direction of force transmitted by the annular nose upon pressing the diaphragm. This may prevent slipping of the diaphragm and may assist in keeping the diaphragm in place during operation of the pressure reducer assembly.

In a further improved embodiment the annular nose further includes a stop surface which engages with a slant surface of a diaphragm support surface when the spring is in the expanded state. This engagement between the stop surface and the slant surface prevents the entire force from being transmitted to the diaphragm. Thus the engagement between the stop surface and the slant surface further prevents damaging of the diaphragm and sticking of the diaphragm to the annular nose.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

Figure 1:
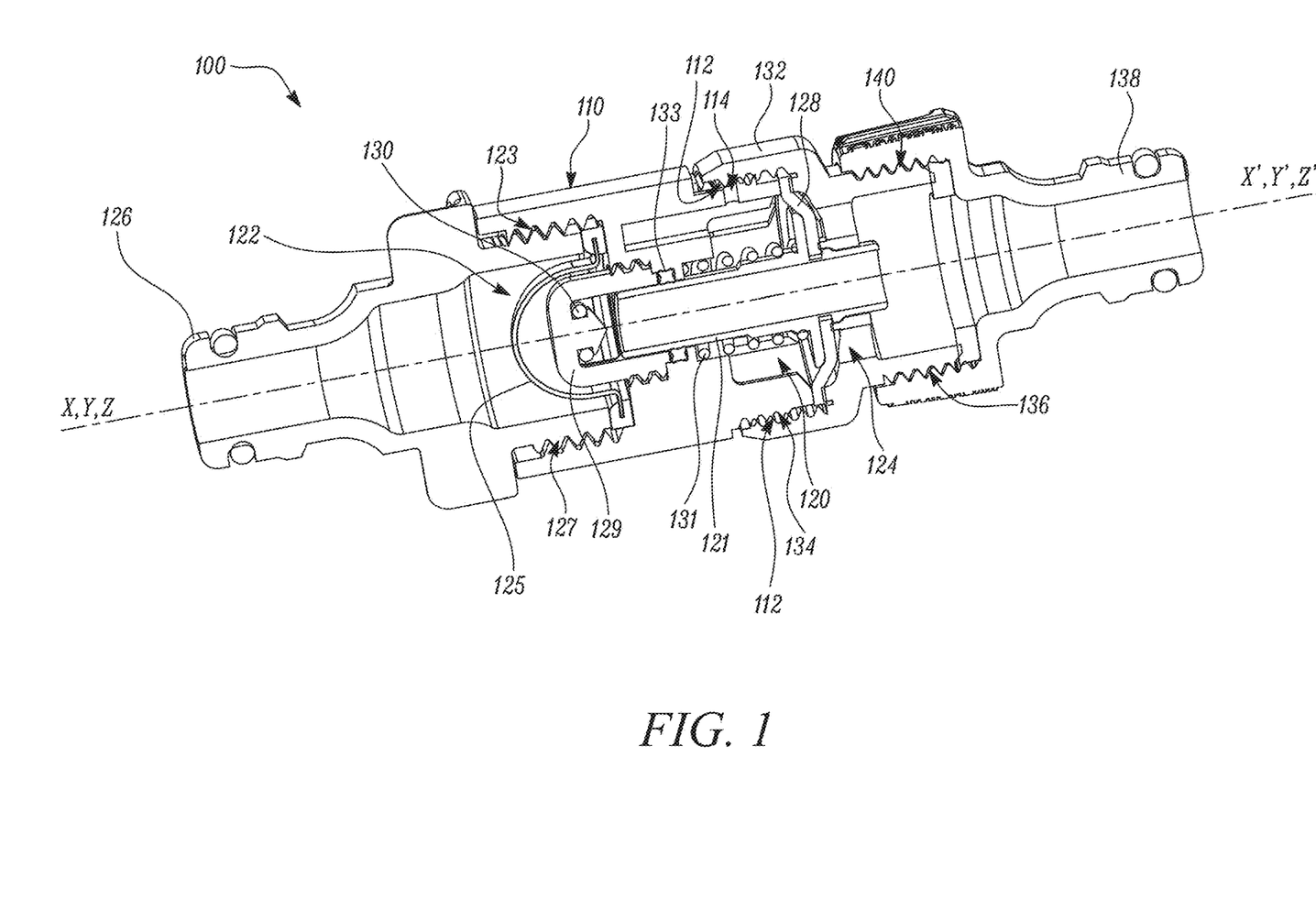
FIG. 1 shows a cross-section view of a pressure reducer assembly, in accordance with an aspect of the present disclosure.

FIG. 1 illustrates a pressure reducer assembly 100. The pressure reducer assembly 100 of the present disclosure is used for reducing a fluid pressure of the fluid intended to be used for drip-irrigation or other gardening operations. However, the pressure reducer assembly 100 of the present disclosure is not restricted with its application area. The pressure reducer assembly 100 may conveniently and efficiently be used for any other domestic or industrial applications.

Further, the fluid used with the pressure reducer assembly 100 may be a liquid (say water) or gas (say air) depending on the application requirement of the pressure reducer assembly 100. The fluid may selectively be provided by a fluid source (not shown) at a pressure equal to more than the output pressure requirements of the application for which the pressure reducer assembly 100 is used.

The fluid source may advantageously be provided with a valve such as to regulate the outflow of the fluid from the fluid source. Further, the fluid source may be provided with an automatic operatable accessory that may automatically regulate the outflow of the fluid from the fluid source. For example, the fluid source may be provided with a watering computer when the fluid is a water. The watering computer may allow and regulate outflow of the water from the fluid source (or water source) depending upon the time of the day, preset water outflow timings, among other factors.

The fluid source may be fluidly coupled to the pressure reducer assembly 100 via a hose or any other means commonly known and understood in the related art without limiting the scope of the present disclosure. In some embodiments, the fluid source may be fluidly coupled to a plurality of pressure reducer assemblies 100 by way of fluid distributors (commonly available in the related art).

The pressure reducer assembly 100, as illustrated in FIG. 1 includes a pressure reducer body 110. The pressure reducer body 110 of the present disclosure is a cylindrical body having a central axis X-X' along a longitudinal direction of the pressure reducer assembly 100. However, in actual implementation of the present disclosure, the pressure reducer body 110 may have any other shape without restricting the scope of the present disclosure. The pressure reducer body 110 may be made of brass, plastic, and aluminum. Various grades of stainless steel (such as 303, 304, and 316) may also be used for the manufacture of the pressure reducer body 110. However, any other material available to handle various fluids and operating environments may be employed for making or manufacturing the pressure reducer body 110. Further, any suitable manufacturing process may be employed for manufacturing of the pressure reducer body 110 without restricting the scope of the present disclosure.

The pressure reducer body 110 defines at least one pressure reducer chamber 120. The pressure reducer chamber 120 is defined along the central axis X-X'. The pressure reducer chamber 120 includes an inlet section 122 and an outlet section 124 fluidly coupled with the inlet section 122 such that the inlet section 122 and the outlet section 124 allow inlet and outlet of the fluid respectively. The inlet section 122 is defined along a central axis Y-Y' and the outlet section 124 is defined along a central axis Z-Z'. In some embodiments, as shown in FIG. 1, the central axes Y-Y', Z-Z' and X-X' coincide with each other along the longitudinal direction of the pressure reducer assembly 100. In some embodiments, the central axes Y-Y', Z-Z' and X-X' may be parallel to each other but may not necessarily coincide with each other. In some embodiments, the central axes Y-Y', Z-Z' and the X-X' may have any other angular orientation with respect to each other or with respect to the longitudinal direction of the pressure reducer assembly 100 without restricting the scope of the present disclosure in any manner.

The inlet section 122 is fluidly coupled to the fluid source via a coupling nipple 126. The coupling nipple 126 may advantageously be designed in a manner such that the coupling nipple 126 selectively allows passage of fluid therethrough (received from the fluid source) only when it is fluidly coupled with the inlet section 122 of the pressure reducer assembly 100. Such a design of the coupling nipple 126 may substantially prevent fluid leakages when the pressure reducer assembly 100 is not operational or not in use. In some embodiments, the inlet section 122 may be sealing coupled to the coupling nipple 126. The sealing may be provided by a sealing gasket, O-ring, or any other known and easily available sealing means (or sealing element).

The inlet section 122 further includes a threaded portion 123 such that the threaded portion 123 threadedly engages with a complimentary threaded portion 127 of the coupling nipple 126. Thus, in the preferred embodiment of the present disclosure, the inlet section 122 and the coupling nipple 126 are threadedly engaged or coupled with each other. However, in actual implementation of the present disclosure, the fluid coupling between the inlet section 122 and the coupling nipple 126 may be accomplished by any means known and understood in the related art.

In the preferred embodiment of the present disclosure, as illustrated in FIG. 1, the inlet section 122 further includes a filter element 125. The filter element 125 may be operatively coupled to the inlet section 122 such that the filter element 125 filters the fluid received from the fluid source before it enters the pressure reducer chamber 120. The filter element 125 prevents clogging of the inlet section 122 and thereby promotes smooth operations of the pressure reducer assembly 100. The filter element 125 may be coupled to the inlet section 122 by any means known in the related art. For example, the filter element 125 may be glued to the inlet section.

Further, the filter element 125 may have any shape, size, and type as per the application requirements. In some embodiments, the filter element 125 may be a surface filter made of closely woven fabric or treated paper with a uniform pore size. Fluid from the fluid source flows through the pores of the filter element 125 and contaminants are stropped on the filter element surface. In some embodiments, the filter element 125 may be a depth filter made of layers of fabric or fibers, which provide many tortuous paths for the fluid to flow through. The pores or passages are larger than the rated size of the filter element 125 for particles to be retained in the depth of the media rather than on the surface. In some embodiments, the filter element 125 may be of the 5-micron, woven mesh, micronic, porous metal, or magnetic type. The micronic and 5-micron elements have non-cleanable filter media and may be disposed of when they are removed whereas the porous metal, woven mesh and magnetic filter elements are designed to be cleaned and reused.

Further, as illustrated in FIG. 1, the inlet section 122 includes a valve 129. The valve 129 selectively allows the fluid from the fluid source to pass through the pressure reducer chamber 120. The valve 129 selectively allows and disallows passage of fluid via the inlet section 122. The valve 129 selectively allows the passage of fluid to the outlet section 124 such as to maintain constant output pressure of the pressure reducer assembly 100. The valve 129 is located downstream of the filter element 125 in the direction of the fluid flow. The valve 129 may be coupled to the inlet section 122 by any suitable means known in the art. However, in the preferred embodiment, the valve 129 is screwed into the inlet section 122. The screw coupling between the valve 129 and the inlet section 122 allows for movement of the valve 129 relative to the inlet section along the longitudinal direction of the pressure reducer assembly 100. The movement of the valve 129 along the longitudinal direction of the pressure reducer assembly 100 may also help in adjusting the constant output pressure generated by the pressure reducer assembly 100.

In some embodiments, the valve 129 may be along the central axis X-X' of the pressure reducer body 110. In some embodiments, the valve 129 may be along the central axis Y-Y' of the inlet section 122. In some embodiments, the valve 129 may be parallel to the central axis X-X' of the pressure reducer body 110. In some embodiments, the valve 129 may be offset to the central axis X-X' of the pressure reducer body 110. In some embodiments, the valve 129 may be at an angle to the central axis X-X' of the pressure reducer body 110. In some embodiments, the valve 129 may be parallel to the central axis Y-Y' of the inlet section 122. In some embodiments, the valve 129 may be offset to the central axis Y-Y' of the inlet section 122. In some embodiments, the valve 129 may be at an angle to the central axis Y-Y' of the inlet section 122. The valve 129 may have orientation relative to the longitudinal direction of the pressure reducer assembly 100 without restricting the scope of the present disclosure in any manner.

The valve 129 further includes a seal 130. The seal 130 may be O-ring or any other type of seal generally available in the related art. In some embodiments, the seal 130 may be a flat seal. In some embodiments, the seal 130 may be a radial seal, i.e., providing sealing of the fluid in the radial direction.

Figure 2A:
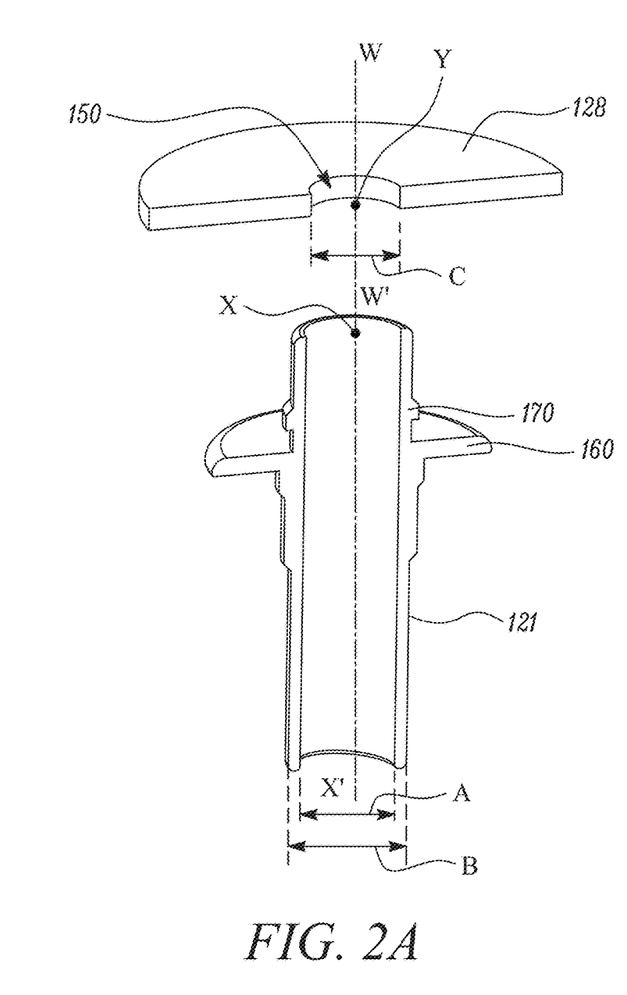
FIG. 2A shows a cross-section view of a piston rod and a diaphragm before assembly, in accordance with an aspect of the present disclosure.
Figure 2B:
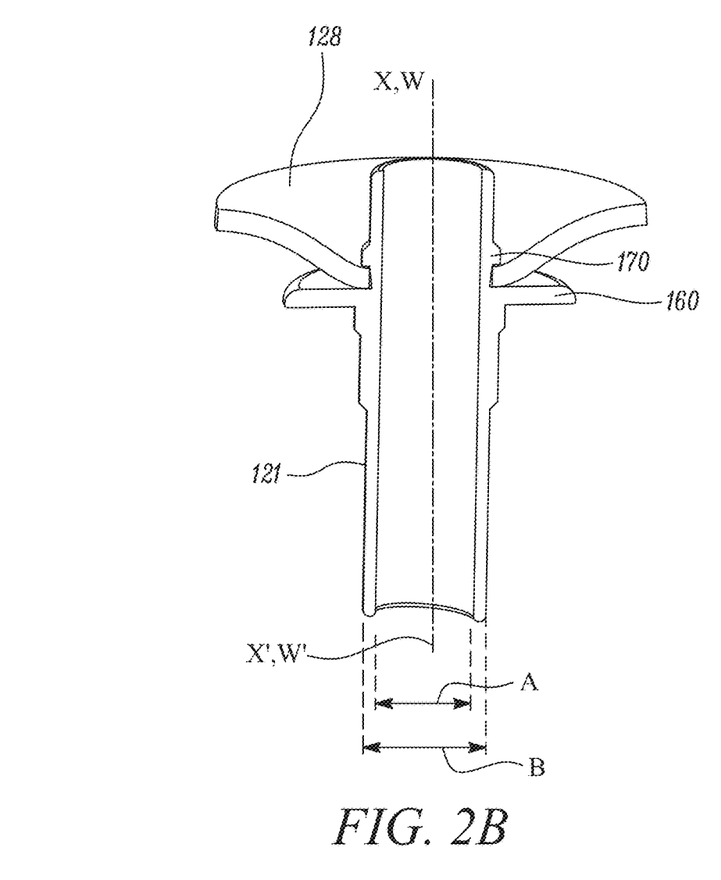
FIG. 2B shows a cross-section view of a piston rod and a diaphragm after assembly, in accordance with an aspect of the present disclosure.

With continued reference to FIG. 1 and further reference to FIGS. 2A and 2B, the pressure reducer chamber 120 further includes a spring-operated piston rod 121. The piston rod 121 is a hollow rod allowing passage of the fluid of which the pressure is to be reduced in the pressure reducer assembly 100. The piston rod 121 has a center "X" along the central axis X-X' when the piston rod 121 is assembled in the pressure reducer chamber 120. Further, the piston rod 121 has an inner diameter "A" and an outer diameter "B". In some embodiments, the inner diameter "A" is 0.6 times of the outer diameter "B". In some embodiments, the inner diameter "A" is 0.45 times of the outer diameter "B". In some embodiments, the inner diameter "A" is equivalent to the outer diameter "B".

The spring 131 may be compression spring or any other known type of spring commonly used to operate the piston rod 121. In some embodiments, the spring 131 may wrap along the outer peripheral surface of the piston rod 121. In some embodiments, the spring 131 may be a plurality of springs 131 equidistantly positioned along the outer peripheral surface of the piston rod 121 such that the plurality of springs 131 are oriented along the longitudinal direction of the pressure reducer assembly 100. The spring 131 may have strength enough to operate the piston rod 121. The spring 131 may have length enough to generate strength to operate the piston rod 121. The spring 131 may not have strength more than what is required to operate the piston rod 121 as the greater strength of the 131 leads to greater installation space of the spring 131 and thus an unnecessary increase in size of the pressure reducer assembly 100.

Further, the piston rod 121 may be concentric with the pressure reducer body 110 or the pressure reducer chamber 120. In some embodiments, the piston rod 121 may have any other orientation relative to the earlier defined central axes X-X', Y-Y' and Z-Z' in accordance with the operational feasibility of the pressure reducer assembly 100. The piston rod 121 of the present disclosure is configured to oscillate back and forth substantially within the pressure reducer chamber 120. The back-and-forth motion of the piston rod 121 is due to differential force experienced by the piston rod 121. The force experienced by the piston rod 121 is due to the spring 131 and a diaphragm 128 operatively coupled with the piston rod 121 in the pressure reducer chamber 120. The direction of motion of the piston rod 121 at any particular time instant is governed by the direction of net force generated upon the piston rod 121 by the spring 131 and the diaphragm 128. For example, the piston rod 121 moves in upstream direction when the net force is in upstream direction due to higher magnitude of force generated by the diaphragm 128 relative to the force generated by the spring 131.

The constant output pressure generated by the pressure reducer assembly 100 may be adjusted by varying the initial distance or the gap between the piston rod 121 and the seal 130 during the manufacturing of the pressure reducer assembly 100. For example, the constant output pressure may be pre-determined and preset during the manufacturing of the pressure reducer according to the application requirements of the pressure reducer assembly 100. Some applications may demand the constant output pressure of 4 bars while other applications such as drip heads and spray nozzles used for gardening operations may demand the constant output pressure of 1.5 bars. Accordingly, the initial distance or the gap between the piston rod 121 and the seal 130 is increased for generating constant output pressure of 4 bars while it is comparatively reduced for generating constant output pressure of 1.5 bars.

The diaphragm 128, as disclosed above, is made of elastic material preferably silicone. The silicone is known for its retention of flexibility and low compression set in extreme heat or cold. Silicone rubber is very durable and overall has good mechanical properties. Because of its durability, it is extremely reliable and is trusted to keep up performance for a long time. The silicone diaphragm 128 may thus be long lasting and cost-effective as it may require less maintenance. Further, the silicone diaphragm 128 offers great electrical insulation, is flame repellent and has a low chemical reactivity.

The diaphragm 128, as illustrated in FIG. 2A, is preferably circular or disc-shaped with a central hole 150 having a center "Y" along a central axis W-W' and a diameter "C". However, the diaphragm 128 may have any other shape with the central hole 150 depending on the factors such as, but not limited to, the shape of the pressure reducer body 110 or the pressure reducer chamber 120. The diaphragm 128 is preferably and advantageously produced or manufactured using stamping process. The stamping process is cost-effective, fast and demands little labor as well as machine operation. Further, the stamping process reduces material wastage, improves accuracy and may be automated. In some embodiments of the present disclosure, the diaphragm 128 may be produced by 1K or 2K injection molding.

Further, in the preferred embodiment, as shown in FIGS. 2A and 2B, the diaphragm 128 is designed in a manner such that the outer diameter "B" of the piston rod 121 is greater than the diameter "C" of the central hole 150 of the diaphragm 128. In some embodiments, the diameter "C" of the central hole 150 of the diaphragm 128 is equal to the outer diameter "B" of the piston rod 121. The diameter "C" of the central hole 150 of the diaphragm 128 is preferably smaller than the outer diameter "B" of the piston rod 121 in order to produce the radial stress over the diaphragm 128 when the diaphragm 128 is forced over the piston rod 121 by any means known in the art so that the central axis X-X' coincides with the central axis W-W'. However, the diameter "C" of the central hole 150 of the diaphragm 128 may not be too small such that the diaphragm 128 tears apart, cracks or breaks when the diaphragm 128 is forced over the piston rod 121.

Figure 3A:
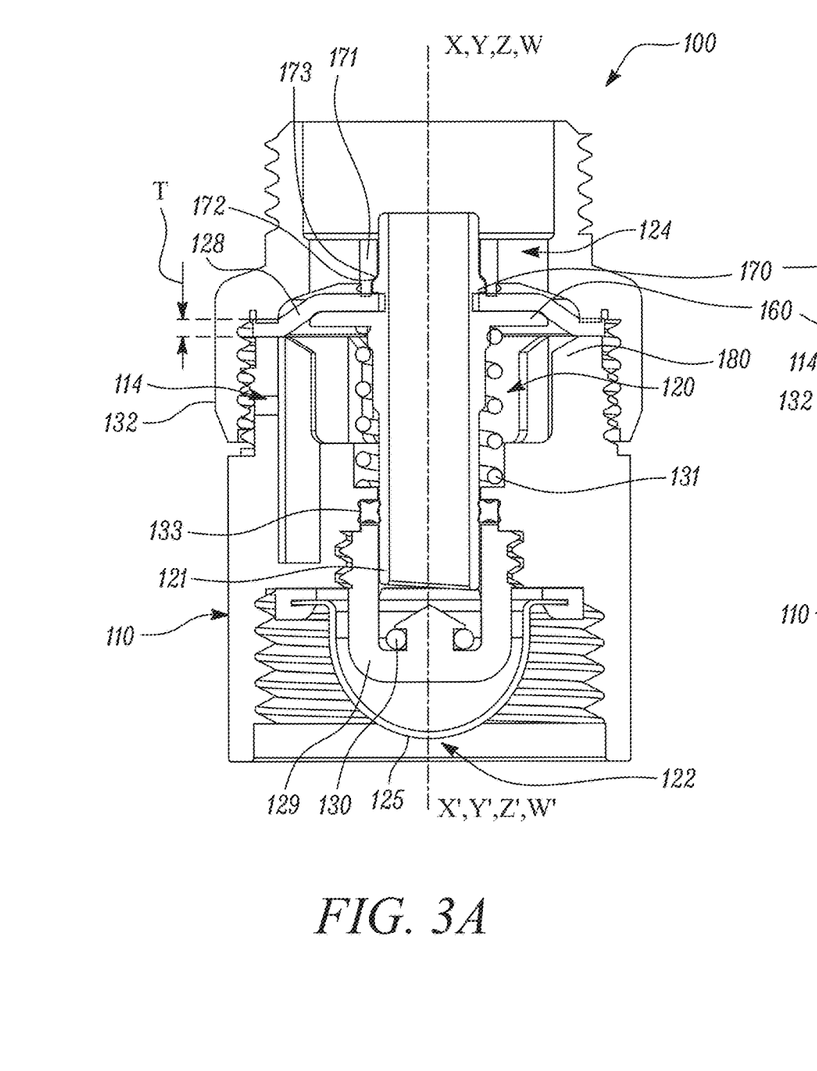
FIG. 3A shows a cross-section view of a pressure reducer, in accordance with an aspect of the present disclosure.
Figure 3B:
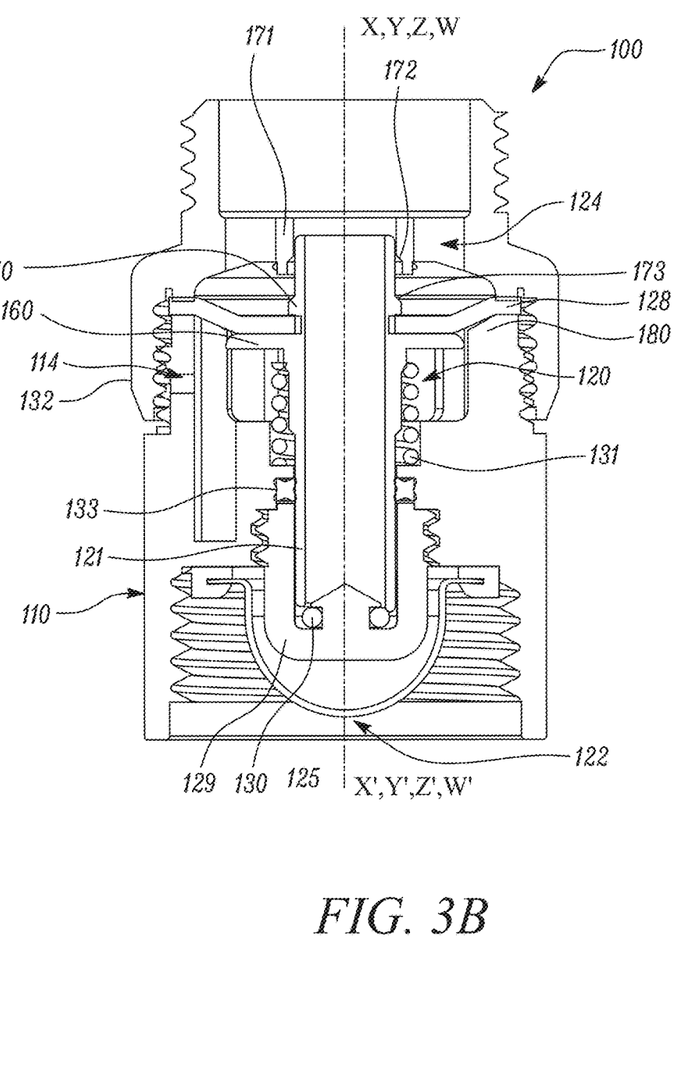
FIG. 3B shows another cross-section view of a pressure reducer, in accordance with an aspect of the present disclosure.

In some embodiments, as shown in FIGS. 3A and 3B, the central axis W-W' coincides with the central axes X-X', Y-Y' and Z-Z'. In some embodiments, the central axis W-W' may coincide with the central axis X-X' and one of the central axes Y-Y' or Z-Z'. In some embodiments, the central axis W-W' may coincide only with the central axis X-X'.

Further, the magnitude of the radial stress over the diaphragm 128 may be dependent on factors such as, but not limited to, the material characteristics of the diaphragm 128, dimensions of the diaphragm 128 and dimensions of the piston rod 121. The radial stress over the diaphragm 128 leads to deformation of the diaphragm 128. The deformation illustrated in the present disclosure is conical deformation such that the conical deformation of the diaphragm 128 leads to bistable buckling of the diaphragm 128 (as shown in FIGS. 3A and 3B). The conical deformation also significantly and advantageously improves the stroke length of the diaphragm 128. In some embodiments, the stroke length of the diaphragm 128 is increased to 6 mm. In actual implementation of the present disclosure, the deformation may lead to some other non-conical shape of the diaphragm 128 without departing from the spirit of the present disclosure.

Further, as shown in FIGS. 2A, 2B, 3A and 3B, the piston rod 121 includes a diaphragm support surface 160 in a direction perpendicular to the longitudinal direction of the pressure reduce body 110. The diaphragm support surface 160 prevents slippage of the diaphragm 128 away from the piston rod 121. The diaphragm support surface 160 allows the diaphragm 128 to be functionally stable. Further, it transmits fluid force to the piston rod 121 such that the piston rod 121 displaces axially. In some embodiments, there is additional diaphragm support surface 170 such that the diaphragm 128 is positioned between the diaphragm support surfaces 160 and 170 for better support. In some embodiments, the diaphragm support surfaces 160, 170 are annular surfaces. In some embodiments, the diaphragm support surfaces 160, 170 are a set of discrete surfaces on the periphery or circumference of the piston rod 121.

In some embodiments, thickness "T" of the diaphragm 128 is equal to the space between the diaphragm support surfaces 160, 170. In some embodiments, thickness "T" of the diaphragm 128 is more than the space between the diaphragm support surfaces 160, 170. In some embodiments, the diaphragm support surfaces 160, 170 may include protrusions and the like to provide better grip and support to the diaphragm 128 sandwiched between the diaphragm support surfaces 160, 170.

In some embodiments, an annular nose 171 is provided adjacent to the diaphragm 128 to press it downwards when the spring 131 is in an expanded state such that the spring 131 presses the diaphragm 128 in an upward direction opposite to the direction of force transmitted by the annular nose 171 upon pressing the diaphragm 128. This may prevent slipping of the diaphragm 128 and may assist in keeping the diaphragm 128 in place during operation of the pressure reducer assembly 100. The annular nose 171 further includes a stop surface 172 which engages with a slant surface 173 of the diaphragm support surface 170 when the spring 131 is in the expanded state. This engagement between the stop surface 172 and the slant surface 173 prevents the entire force from being transmitted to the diaphragm 128. The engagement between the stop surface 172 and the slant surface 173 further prevents damaging of the diaphragm 128 and sticking of the diaphragm 128 to the component 171.

Figure 4:
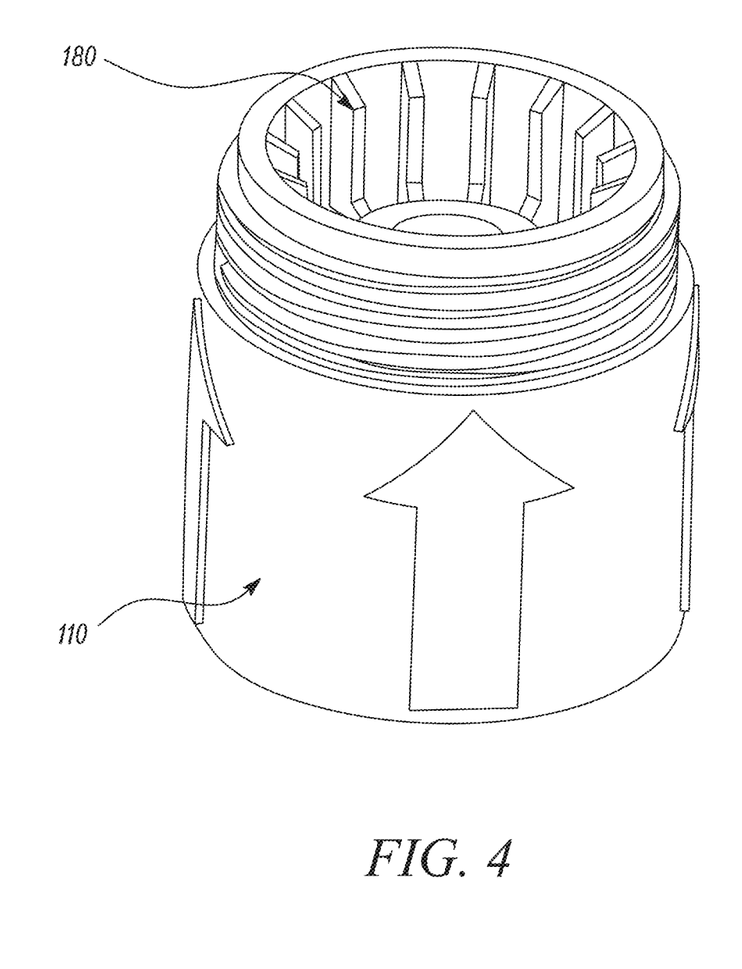
FIG. 4 shows a perspective view of a pressure reducer body, in accordance with an aspect of the present disclosure.

The slippage of the diaphragm 128 is additionally prevented by a plurality of equally or unequally spaced apart ribs 180 (as shown in FIGS. 3A, 3B and 4) provided on the interior surface of the pressure reducer body 110. In some embodiments, the ribs 180 may be integrally formed with the pressure reducer body 110. In some embodiments, the ribs 180 may be removably attached with the pressure reducer body 110 for easy maintenance of the pressure reducer body 110.

With continued reference to FIGS. 1, 3A, 3B and 4, the pressure reducer body 110 includes a first threaded portion 112 on its outside surface facing opposite to the pressure reducer chamber 120. The first threaded portion 112 may be used for coupling the pressure reducer body 110 with other accessories of the pressure reducer assembly 100. The pressure reducer body 110 further includes a pressure compensation hole 114. The pressure compensation hole 114 ensures unrestricted mobility of the piston rod 121. The pressure compensation hole 114 allows release of air pressure generated in the pressure reducer chamber 120 when the piston rod 121 moves in the upstream direction of the fluid flow in the pressure reducer assembly 100. The pressure compensation hole 114 allows air to escape from the pressure reducer chamber 120 when the piston rod 121 moves in the upstream direction of the fluid flow in the pressure reducer assembly 100. Conversely, the pressure compensation hole 114 allows suction of the surrounding air (external to the pressure reducer assembly 100) when the piston rod 121 moves in the downstream direction of the fluid flow in the pressure reducer assembly 100.

In some embodiments, the pressure compensation hole 114 is a circular hole. The hole is preferably circular as it is easy to drill a circular hole. Further, it substantially prevents material wastage when compared with manufacturing or producing holes of other shapes. However, the hole may have any other suitable shape without restricting the scope of the present disclosure.

In some embodiments of the present disclosure, the pressure compensation hole 114 may be a channel extending at least partially along a length of the pressure reducer body 110. The channel provides relatively more area for fluid ventilation during the working of the pressure reducer assembly 100. Thus, even if the channel is partially clogged due to unforeseen or uncontrollable external factors or interferences, the fluid ventilation may still be enough to promote unhindered working of the pressure reducer assembly 100. Further, the channel may be straight channel, zig-zag channel, or the channel with any other configuration without limiting the scope of the present disclosure.

In some embodiments, air in the pressure reducer chamber 120 surrounding the spring-operated piston rod 121 is sealed from the valve 129 using a sealing element 133. The sealing element 133 prevents mixing of air in the pressure reducer chamber 120 with the fluid introduce in the pressure reducer assembly 100 via the inlet section 122. The sealing element 133 may be O-ring or any other commonly available sealing element known in the art without restricting the scope of the present disclosure.

Further, a flange 132 is sealing coupled with the pressure reducer body 110 such that the sealing disallows the backflow of fluid past the outlet section 124. The flange 132 is concentric with the pressure reducer body 110. The diaphragm 128 seals the coupling between the flange 132 and the pressure reducer body 110. The boundaries or the extremities of the diaphragm 128 are abutted or pressed between the flange 132 and the pressure reducer body 110, thereby providing a fluid-tight sealing. The fluid tight sealing is the outcome of the contact pressure exerted on the diaphragm 128 due to the coupling between the flange 132 and the pressure reducer body 110.

The sealing prevents or disallows the backflow of fluid past the outlet section 124, thereby eliminating any possible leakage and improving the overall efficiency of the pressure reducer assembly 100. Further, the multiple usage or application of the diaphragm 128 means no separate sealing elements such as O-rings are required for the sealing. Hence, the pressure reducer assembly 100 is easy to assemble with all its necessary components or accessories with further advantage of lower manufacturing expenses due to less components or material required for the assembly or manufacturing of the pressure reducer assembly 100. Further, due to less components, pressure reducer maintenance cost is also reduced. Furthermore, the sealing may prevent ingress of air in the outlet section 124, thereby preventing mixing of air drawn-in from the pressure compensation hole 114 with the fluid (say liquid).

The flange 132 has a second threaded portion 134 complimentary to the first threaded portion 112 such that the pressure reducer body 110 and the flange 132 are threadedly coupled to each other through the first and the second threaded portion 112, 134. However, in some embodiments of the present disclosure, the flange 132 may be coupled to the pressure reducer body 110 by any other suitable means such as with adhesives without limiting the scope of the present disclosure.

The flange 132 further includes a third threaded portion 136. The third threaded portion 136 is formed on an outer surface of the flange 132 contrary to the second threaded portion 134, which is formed on an inner surface of the flange 132. The third threaded portion 136 faces the pressure reducer body 110 while the second threaded portion 134 faces away from the pressure reducer body 110 in an opposite direction.

The second threaded portion 134 couples the flange 132 with the pressure reducer body 110 whereas the third threaded portion 136 couples the flange 132 with a connector 138 (or a nipple 138). The connector 138 may complete the pressure reducer assembly 100 and may allow the fluid with the reduced pressure to be transported for various domestic and industrial applications. The coupling between the flange 132 and the connector 138 is a threaded coupling due to threaded engagement of the third threaded portion 136 and a threaded portion 140 of the connector 138. However, in some embodiments, the coupling between the flange 132 and the connector 138 may be due to any other coupling means known and understood in the related art.

In operation, the fluid from the fluid source enters the pressure reducer assembly 100 at high pressure from the inlet section 122. The fluid is filtered using filter element 125 before it reaches the valve 129. The valve 129 selectively allows the passage of the fluid towards the spring-operated hollow piston rod 121. The fluid from the piston rod 121 flows outwards towards the flange 132 and finally towards the connector 138 for use with various domestic and industrial applications.

The pressure of the high-pressure fluid from the fluid source is reduced by the oscillating motion of the piston rod 121 substantially within the pressure reducer chamber 120. The piston rod 121 oscillates to reduce the fluid pressure to the constant output pressure. The piston rod 121 momentarily block the supply of fluid from the inlet section 122 towards the outlet section 124. The piston rod 121 blocks the supply of fluid by engagement with the seal 130 of the valve 129. The seal 130 may axially or radially seal the piston rod 121 to prevent the fluid from entering the piston rod 121.

The piston rod 121 momentarily blocks the supply of fluid from the inlet section 122 when it is pressed by the diaphragm 128 against the spring force towards the upstream direction of the fluid flow. Further, the fluid may also lose some energy when the fluid presses the diaphragm 128 such that the diaphragm further presses the piston rod 121 to make it move towards the upstream direction of the fluid flow. This way, the high fluid pressure is reduced to the final output pressure.

Further, when the fluid pressure near the output section 124 is reduced to the final value, the spring 131 may overcome the force of the diaphragm 128 such that the piston rod 121 moves in the downstream direction towards its original position. The oscillating movement of the piston rod 121 is assisted by the pressure compensation hole 114 as already discussed above.

Thus, the present disclosure provides an improved diaphragm design for the pressure reducer assembly 100. The diaphragm 128 advantageously includes a central hole 150 with the diameter "C" less than the outer diameter "B" of the piston rod 121 such that when the diaphragm 128 is forced over the piston rod 121, the diaphragm 128 deforms due to the radial stress. The deformation of the diaphragm 128 significantly improves the stroke length of the diaphragm 128.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Pressure Reducer Assembly
110 Pressure Reducer Body
112 First Threaded Portion
114 Pressure Compensation Hole
120 Pressure Reducer Chamber
121 Piston Rod
122 Inlet Section
123 Threaded Portion
124 Outlet Section
125 Filter Element
126 Coupling Nipple
127 Threaded Portion
128 Diaphragm
129 Valve
130 Seal
131 Spring
132 Flange
133 Sealing Element
134 Second Threaded Portion
136 Third Threaded Portion
138 Connector/Nipple
140 Threaded Portion
150 Central Hole
160, 170 Diaphragm Support Surface
171 Nose
172 Stop Surface
173 Slant Surface
180 Ribs
A Inner Diameter
B Outer Diameter
C Diameter
X Center
Y Center
T Thickness
X-X' Central Axis
Y-Y' Central Axis
Z-Z' Central Axis
W-W' Central Axis

The invention claimed is:
1. A pressure reducer assembly comprising:
a pressure reducer body defining at least one pressure reducer chamber along a central axis, the pressure reducer chamber including:
an inlet section and an outlet section fluidly coupled with the inlet section such that the inlet section and the outlet section allow inlet and outlet of the fluid respectively;
a spring-operated hollow piston rod having a center along the central axis, a cylindrical inner peripheral surface comprising an inner diameter and a cylindrical outer peripheral surface comprising an outer diameter; and
a diaphragm made of elastic material and adapted to be operatively coupled with the piston rod, wherein the diaphragm has a central hole having a center along a central axis and a diameter;

wherein, in an unmounted state, the outer diameter of the piston rod is greater than the diameter of the central hole of the diaphragm, wherein, in a mounted state, the outer diameter of the piston rod is the same as the diameter of the central hole of the diaphragm, wherein the diaphragm is assembled over the piston rod so that the central axis coincides with the central axis, wherein a radial stress leads to deformation of the diaphragm, and wherein the deformation is a conical deformation.

2. The pressure reducer assembly of claim 1,
wherein, in the unmounted state, the diameter of the central hole of the diaphragm is equal to the inner diameter of the piston rod.

3. The pressure reducer assembly of claim 1,
wherein the diaphragm is made of silicone.

4. The pressure reducer assembly of claim 1,
wherein the diaphragm is produced by stamping.

5. The pressure reducer assembly of claim 1,
wherein the piston rod includes a diaphragm support surface.

6. The pressure reducer assembly of claim 1,
wherein an annular nose is provided adjacent to the diaphragm to press the diaphragm in a direction opposite to a direction of force transmitted by the annular nose upon pressing the diaphragm, when a spring is in an expanded state.

7. The pressure reducer assembly of claim 6,
wherein the annular nose includes a stop surface which engages with a slant surface of a diaphragm support surface when the spring is in the expanded state.

8. The pressure reducer assembly of claim 1, wherein a difference in size of the diameter of the central hole of the diaphragm and the outer diameter of the piston rod results in the conical deformation of the diaphragm.

9. A pressure reducer assembly comprising:
a pressure reducer body defining at least one pressure reducer chamber along a central axis, the pressure reducer chamber including:
an inlet section and an outlet section fluidly coupled with the inlet section such that the inlet section and the outlet section allow inlet and outlet of the fluid respectively;
a spring-operated hollow piston rod having a center along the central axis, a cylindrical inner peripheral surface comprising an inner diameter and a cylindrical outer peripheral surface comprising an outer diameter; and
a diaphragm made of elastic material and adapted to be operatively coupled with the piston rod, wherein the diaphragm has a central hole having a center along a central axis and a diameter;
wherein, in an unmounted state, the outer diameter of the piston rod is greater than the diameter of the central hole of the diaphragm,
wherein, in a mounted state, the outer diameter of the piston rod is the same as the diameter of the central hole of the diaphragm,
wherein the diaphragm is assembled over the piston rod so that the central axis coincides with the central axis, and
wherein, in the unmounted state, the diameter of the central hole of the diaphragm is equal to the inner diameter of the piston rod.

10. The pressure reducer assembly of claim 9,
wherein a radial stress leads to deformation of the diaphragm.

11. The pressure reducer assembly of claim 10,
wherein the deformation is a conical deformation.

12. The pressure reducer assembly of claim 11, wherein a difference in size of the diameter of the central hole of the diaphragm and the outer diameter of the piston rod results in the conical deformation of the diaphragm.

13. A pressure reducer assembly comprising:
a pressure reducer body defining at least one pressure reducer chamber along a central axis, the pressure reducer chamber including:
an inlet section and an outlet section fluidly coupled with the inlet section such that the inlet section and the outlet section allow inlet and outlet of the fluid respectively;
a spring-operated hollow piston rod having a center along the central axis, a cylindrical inner peripheral surface comprising an inner diameter and a cylindrical outer peripheral surface comprising an outer diameter; and
a diaphragm made of elastic material and adapted to be operatively coupled with the piston rod, wherein the diaphragm has a central hole having a center along a central axis and a diameter;
wherein, in an unmounted state, the outer diameter of the piston rod is greater than the diameter of the central hole of the diaphragm,
wherein, in a mounted state, the outer diameter of the piston rod is the same as the diameter of the central hole of the diaphragm,
wherein the diaphragm is assembled over the piston rod so that the central axis coincides with the central axis,
wherein an annular nose is provided adjacent to the diaphragm to press the diaphragm in a direction opposite to a direction of force transmitted by the annular nose upon pressing the diaphragm, when a spring is in an expanded state, and
wherein the annular nose includes a stop surface which engages with a slant surface of a diaphragm support surface when the spring is in the expanded state.

14. The pressure reducer assembly of claim 13, wherein a difference in size of the diameter of the central hole of the diaphragm and the outer diameter of the piston rod results in a conical deformation of the diaphragm.

* * * * *

UNITED STATES PATENT AND TRADEMARK OFFICE
CERTIFICATE OF CORRECTION

PATENT NO. : 12,061,487 B2  
APPLICATION NO. : 18/273099  
DATED : August 13, 2024  
INVENTOR(S) : Thomas Renner Page 1 of 1

It is certified that error appears in the above-identified patent and that said Letters Patent is hereby corrected as shown below:

On the Title Page

In Item (73), the Assignee, "HUSQVARNA" should be changed to -- HUSQVARNA AB --

Signed and Sealed this  
Nineteenth Day of August, 2025

Coke Morgan Stewart  
*Acting Director of the United States Patent and Trademark Office*